United States Patent [19]

Rossell

[11] Patent Number: 4,543,462

[45] Date of Patent: Sep. 24, 1985

[54] METHOD FOR ESTABLISHING A GALVANIC BOND BETWEEN AN INSULATED WORK PIECE AND A WELDING ELECTRODE AND AN ELECTRODE ARRANGEMENT FOR THE EXECUTION AND ITS USE

[75] Inventor: Jame Rossell, Lausanne, Switzerland

[73] Assignee: Rossell Electronique SA, Switzerland

[21] Appl. No.: 682,484

[22] PCT Filed: May 11, 1981

[86] PCT No.: PCT/CH81/00051

§ 371 Date: Jan. 8, 1982

§ 102(e) Date: Jan. 8, 1982

[87] PCT Pub. No.: WO81/03298

PCT Pub. Date: Nov. 26, 1981

Related U.S. Application Data

[63] Continuation of Ser. No. 339,440, Jan. 8, 1982, abandoned.

[30] Foreign Application Priority Data

May 14, 1980 [DE] Fed. Rep. of Germany ....... 3018399

[51] Int. Cl.$^4$ ............................................ B23K 11/00
[52] U.S. Cl. ............................... 219/91.21; 219/56.22; 219/119
[58] Field of Search ................... 219/91.21, 119, 56.1, 219/56.21, 56.22, 58

[56] References Cited

U.S. PATENT DOCUMENTS 3,263,059 7/1966 Rzant ................................. 219/119
3,418,444 12/1968 Ruehlemann ..................... 219/91.21

FOREIGN PATENT DOCUMENTS 1416078 9/1965 France .
1412147 9/1965 France .
52-72345 6/1977 Japan ................................. 219/91.21
130722 4/1978 Poland .

Primary Examiner—Clifford C. Shaw
Attorney, Agent, or Firm—Lerner, David, Littenberg, Krumholz & Mentlik

[57] ABSTRACT

In the use of U-shaped electrodes with a current supply and return in regards to the working area whereby for the stripping of insulated work pieces a heating current is applied before the welding operation, different conductor cross section requirements for the heating and welding operation present themselves. During the heating operation a cross section reduction is necessary to obtain enough heat output, but this is undesired for the welding operation. In order to solve this contradiction it is proposed to supply an electrode with a heating current supply (25a) and a return (25b), leading to the working area and returning respectively and to apply a common potential to the supply and return for the welding operation.

8 Claims, 12 Drawing Figures

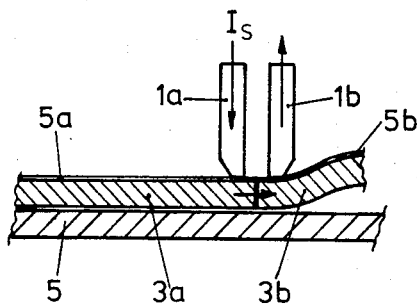
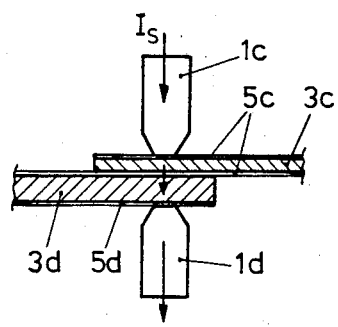
FIG. 1   FIG. 2
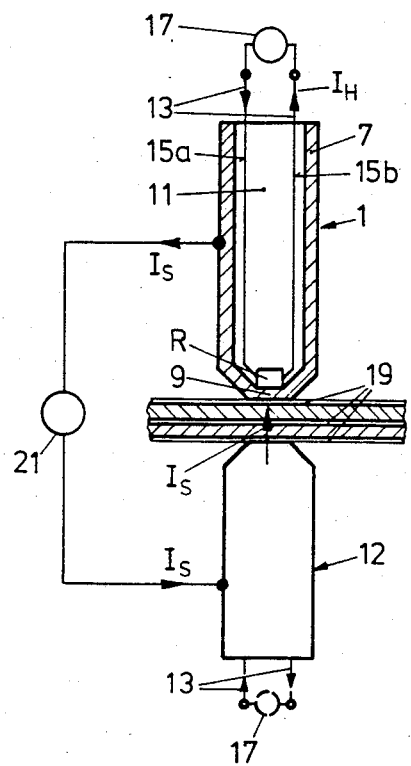
FIG. 3
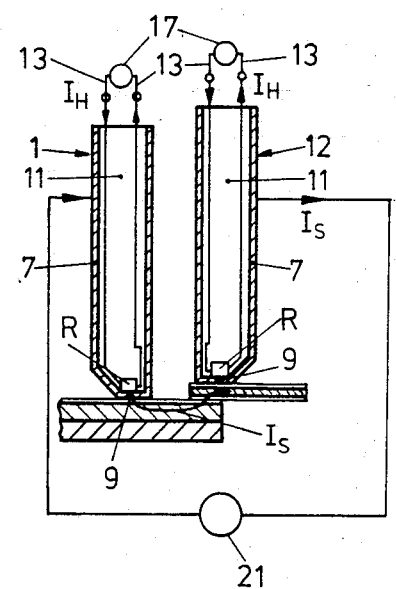
FIG. 4

METHOD FOR ESTABLISHING A GALVANIC BOND BETWEEN AN INSULATED WORK PIECE AND A WELDING ELECTRODE AND AN ELECTRODE ARRANGEMENT FOR THE EXECUTION AND ITS USE

This is a continuation of application Ser. No. 339,440, filed Jan. 8, 1982, now abandoned, and as described and claimed in International Application PCT/CH 81/00051, filed May 11, 1981.

The present invention concerns a method for establishing a galvanic contact between an insulated work piece and welding electrodes; the subsequent welding of this work piece whereby at least one of the electrodes has a heating current loop which is connected to the working area of the electrode as a supply and return whereby a potential difference can be applied through this loop in the heating or in the stripping phase; and an electrode arrangement for the execution of such, and its use.

PRESENT STATE OF TECHNOLOGY

From the Japanese Pat. Nos. 45-15 856 and 49-3 380, a construction is known in which heating current flows before the welding operation. By a decrease in the cross section of the loop conductor, the latter will be correspondingly higher in resistance in its working area in order to ensure the necessary heat in the heating process. The problem arising from the technique described here is that, although advantageous in its use of the same conductor arrangement for the conduction of the heating current and for the conduction of the welding current, the reduced cross section of the conductor (for the heating operation) can lead to undesirable high heating of the electrode during the welding operation.

DESCRIPTION OF THE INVENTION

The present invention serves to alleviate the above-mentioned disadvantage, and to prevent thereby unwanted heating of the electrode in the welding operation as occurs in the type of method previously mentioned. This is achieved by applying an equal potential to the two conductors of the loop, thereby changing them to parallel welding current conductors.

It is now also possible to take a temperature measurement of the electrode in the working area, which the considerable significance if the welding is to take place corresponding to the transfer resistance between electrode and welding piece, since the electrode is heated only slightly due to its own conductor resistance in the welding operation. Preferably, after the temperature is measured, a switch from the heating to the welding operation takes place and the welding operation is controlled or adjusted.

An electrode arrangement for the execution of the described method distinguishes itself in that at least one electrode is constructed as a loop with a current supply to the working area and a return line, and in that welding current connections are provided for both conductors.

Preferably, the electrode has along its working area a portion with a higher resistance for the heating current, the portions bordering on this sides of the working area having a low resistance so that the welding current thereby flows mostly through the portion with the relatively low resistance. Therefore it is ensured that the welding current flows only minimally through the provided portion of increased resistance for the heating operation, i.e., mostly directed to the left and right of this area of the work piece.

A simple design form of the electrode, achieved for use in the mentioned method, is to make it U-shaped. Preferably it is formed such that the U base forms the working area so that it has a reduced cross section in the middle area and in the side areas an enlarged cross section. The reduction of electrode heating in its working area, during the welding process, results in the possibility that on the electrode a thermal sensor can be provided directly on its working area, the output signal of which, especially in the welding operation, represents the temperature of the actual welding operation and not the entire welding current-related electrode heating. The mentioned arrangement is used preferably for spot or aperture welding, especially for micro-spot or micro-aperture welding, and if need be, for soldering, especially micro-soldering.

BRIEF DESCRIPTION OF THE FIGURES

The invention is described in the following with the aid of figures. Shown are:

FIG. 1 a schematic representation of two common aperture welding electrodes on a work piece, with applied welding current, FIG. 2 a representation similar to FIG. 1 for spot welding electrodes.

FIG. 3 the schematic representation of an electrode according to the invention, and also a completely developed opposing electrode for spot welding according to the invention, FIG. 4 a schematic representation, similar to FIG. 3, of two completely developed aperture welding electrodes according to the invention, FIG. 5 a perspective view of two developed spot welding electrodes on the work piece according to the invention, FIG. 6 a perspective view of two developed aperture welding electrodes on the work piece according to the invention, FIG. 7 a perspective view of a preferred electrode, FIG. 8 a schematic arrangement of two developed spot welding or aperture welding electrodes according to the invention, each with one heating current generator and a welding current generator, FIG. 9 a schematic representation according to FIG. 8 with temperature measurement on one or both electrodes and corresponding regulation of the heating and welding phase, FIG. 10 a schematic representation of two spot welding or aperture welding electrodes according to the invention, with a common heating current generator and a welding current generator, FIG. 11 a representation similar to FIG. 10 with temperature measurement on one or both electrodes and corresponding regulation of the heat and welding phase, FIG. 12 a representation similar to FIG. 10 with the measurement of heating current and corresponding regulation of the heating and welding phase.

DETAILED DESCRIPTION OF THE INVENTION

Figure 5:
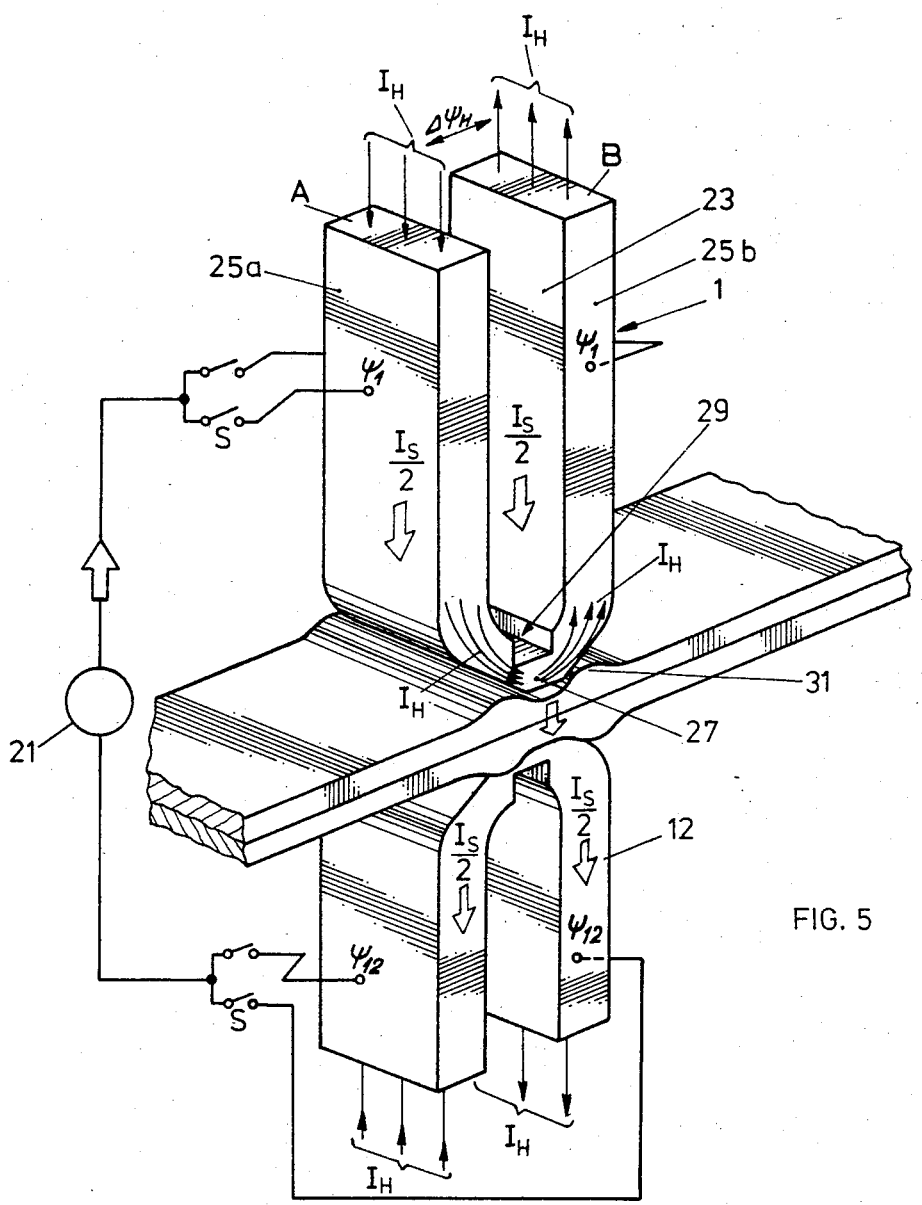

Shown in FIG. 1 is a known arrangement of two aperture welding electrodes 1a and 1b, which are to be electrically in contact for the welding process, with two working pieces 3a and 3b to be connected, whereby for example 3a is a conductive strip on a carrier substrate 5. The welding current $I_S$ flows in the welding operation from the electrode 1a over the work piece 3a, which it is in contact with, and goes thereby to the work piece 3b to be connected to work piece 3a, and back to the opposing electrode 1b. When one and/or the other work piece has an insulation layer 5a or 5b, this must be removed before starting the welding phase, so that the two electrodes 1a and 1b can be brought into electrical contact with the work pieces 3a and 3b.

Represented in FIG. 2, similar to FIG. 1, are two spot welding electrodes 1c and 1d where each is to be electrically in contact with work pieces 3c and 3d to be connected. $I_S$ again represents the welding current. Here again an insulation layer 5c or 5d, when present, prevents the electrical connection between the two electrodes 1c and 1d, and must be removed before the welding. In the micro-technique especially, problems are encountered with the stripping, through the typical dimensions, of the work pieces, for example wire cross sections of a few μm. A mechanical removal of the insulation layer is hardly possible without damaging these work pieces. A removal of the insulation layer by means of solvents has to be done beforehand, i.e. in a place away from the welding working station which considerably complicates the work flow.

In FIGS. 3 and 4 a primary basically improved variation of the inventive electrode is represented; in FIG. 3 in the application as a spot welding electrode, in FIG. 4 as aperture welding electrode. The electrode according to the invention will be generally designated with 1 in the following, and an opposing electrode as 12, which should mean that the opposing electrode can be constructed according to the invention (digit 1) or in the typical fashion (digit 2). The electrode 1 includes, in the improved version according to FIGS. 3 and 4, a metallic hollow body 7, closed on one side by the electrode working area 9 having, an improved working area. In the hollow body 11 is a conductive loop 13 which goes to the working area 9 of the electrode. On the working area 9 the current loop 13 has an increased resistance as far as the supply and return 15a and 15b is concerned. With the aid of a schematically represented current generator 17, a heating current $I_H$ is fed over the loop 13 and the supply and return line 15a, 15b, and resistor R, whereby, especially in the working area 9, the metallic electrode body 7 will be heated up. Consequently, the insulation layer or at least the insulation layers 19, will be melted away on the work piece, which allows electrical contact of the two work pieces with electrode 1 and electrode 12. When this galvanic connection is ensured by sufficiently little transfer resistance the welding current $I_S$ is carried from electrode 12 by means of a schematically represented welding current generator 21. On the opposing electrode 12 is, represented by a dotted line, a conductive loop 13 and heating current generator 17, showing the possibility that this opposing electrode 12 also can be constructed according to the invention, depending on the work piece insulation relationship.

In FIG. 4 the arrangement, similar to FIG. 3, for aperture welding electrodes is represented.

Figure 6:
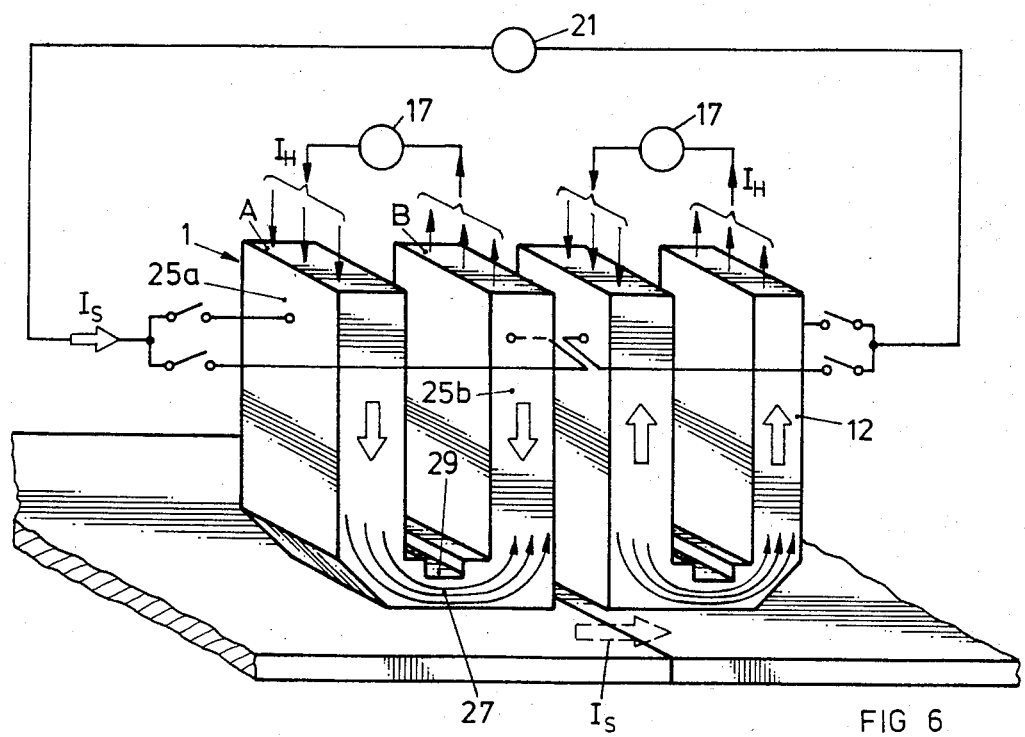

FIGS. 5 and 6 show a perspective view of an additional preferred improved variation of the electrode according to the invention, in FIG. 5 for spot welding and in FIG. 6 for aperture welding. Although both electrodes according to the invention are shown here in the improved form, the opposing electrode can be of a typical type.

The electrode 1 is divided into two sides, by a slit 23, the sides serving as supply and return 25a and 25b to the working area, depending on the direction of flow of the heating current $I_H$.

Adjacent to the working area 27 the slit 23 has an inlet, or opening 29 so that the thickness of the wall formed by the current loop through the supply and return 25a and 25b and also the working area 27 will be smaller on the working area 27 than at the supply and return.

With a heating current generator, not shown here, the heating current $I_H$ is forced through the current loop 25a, 25b, 27, whereby, as shown by arrows, the current density is smaller in the supply and return than on the working area 27. Consequently, during the heating phase, the working area 27, which is in contact with the work piece insulator 31, is heated up. Consequently the insulator 31 is melted away and forced away from the metallic work piece material to permit electrical contact. After this heating or stripping phase, a potential difference is applied between the electrode 1 and the opposing electrode 12 as a whole, and the welding current $I_S$ is forced from one electrode through the two work pieces to the other electrode. In the welding phase, therefore, the same potential $\psi_1$ is applied on the electrode 1, supply and return 25a and 25b, and working area 27. While in the heating phase, to cause the heating current flow, a potential difference is applied, shown with $\Delta\psi_H$ through the loop 25a, 25b, 27. As shown, the welding potential $\psi_1$ and $\psi_{12}$ are applied equally to the supply and return 25a and 25b in order to ensure a symetrical distribution of the welding current $I_S$ to both metallic sides 25a, 25b. The supply and return are thereby connected in series for the heating current $I_H$ in the heating phase, parallel for the welding current $I_S$. For the typical relatively higher welding current $I_S$ the sum of the side cross sectional surface A and B have to be considered for the losses, the individual cross sectional surface A or B for the heating current $I_S$.

FIG. 6 shows the same electrodes 1 and 12 with the improvement according to FIG. 5. arranged for aperture welding. Here separately provided heating current generators 17, are provided, for example, and are schematically shown. It is understood that the electrode can have different tips and working areas depending on its use.

Figure 7:
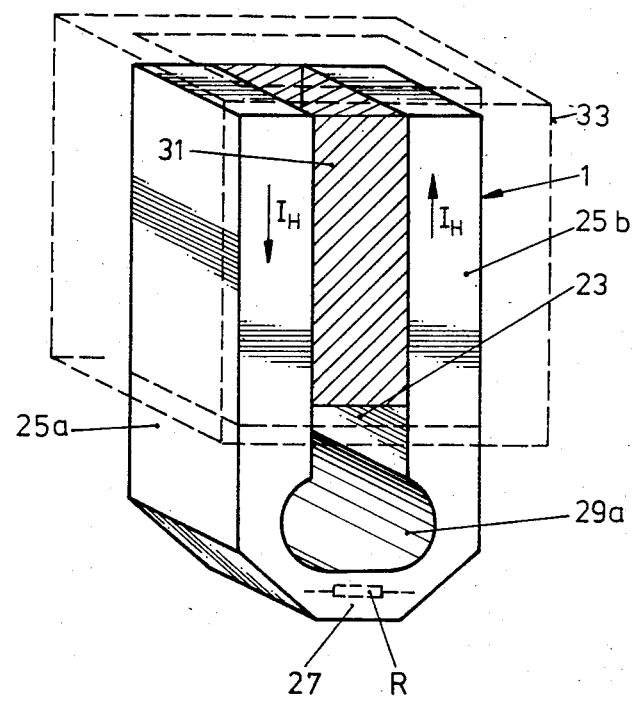

Shown in FIG. 7 is a preferred design form of electrode 1, which can be used as a spot or aperture welding electrode, especially for micro-spot or micro-aperture welding applications. The slit 23 has adjacent thereto the working area 27 of the electrode, and an eliptical borehole 29a, easily manufactured and analogous to opening 29 of FIG. 5, is provided with which an area of higher resistance can be realized for the heating current $I_H$ as indicated with dotted lines by R. During the heating of the working area 27, the supply and return 25a and 25b also radiate heat, although such heat is continuously decreasing with the increased distance from the working area 27. The loss of heat is reduced on the supply and return by the insertion of a thermal and electrical high insulating insert 31, preferably a ceramic insert, whereby, as indicated by dotted lines, a complete embedment can be provided for the supply and return in such a high insulating body 33. However, this would necessitate a considerable cost increase.

The described electrode can, as mentioned many times before, be used as spot weld or aperture weld electrode, whereby the one and/or other of the two provided electrodes can be constructed according to the invention for these methods. The same electrode can be used additionally as a soldering electrode without any changes in construction, and if need be, with a snap-on work tip (not shown), in order to prevent contamination of the welding working area by the soldering. The heating current denoted with $I_H$ in the figures for the welding operation would be soldering heat current in the soldering operation.

Figure 8:
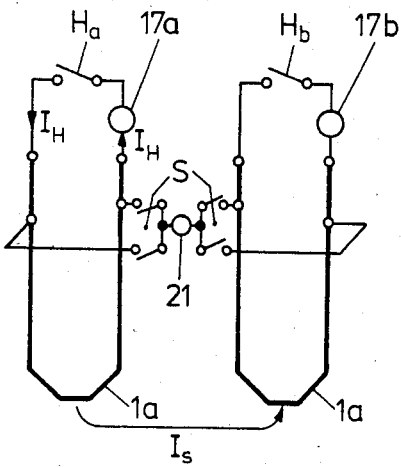

In FIG. 8 schematically shown are two electrodes 1a, b according to the invention for spot welding or aperture welding. The side by side arrangement of the electrodes 1 in this and the following figures should not be misconstrued as the exclusive arrangement for aperture welding. For the heating phase both electrodes 1 are provided with a separate heat current generator 17a and 17b and each with a control switch $H_a$ or $H_b$, shown schematically. Furthermore, both electrodes are connected with a welding current generator 21 by a control switch S. By closing of the control switches $H_a$ and $H_b$ the heating phase of the electrodes 1a and 1b is actuated and by closing of switch S the welding phase is actuated. It has to be emphasized, therefore, that the switch S, the same as the switches $H_a$ and $H_b$, is not needed when, for instance, either the heat currents $I_H$ can flow also during the welding current flow and/or the welding current flow $I_S$ is actuated by the fact that the working piece insulation is melted away. In the latter case the switch S corresponds to FIG. 8, actually by the switching distance formed by the insulation layer to be melted through.

Figure 9:
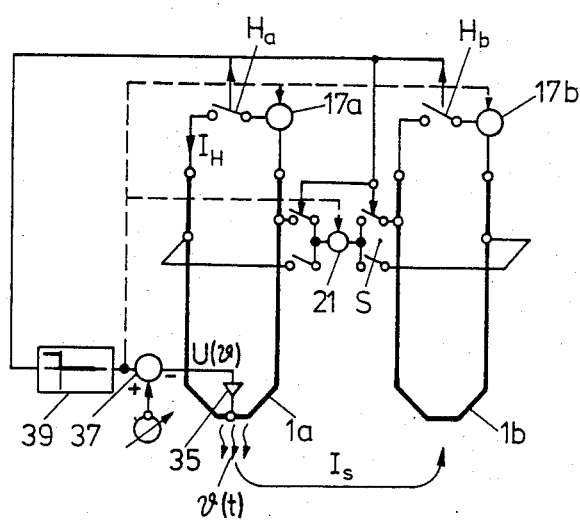

A possible control is shown in FIG. 9, which is similar to FIG. 8, as to the operation of the two electrodes 1a and 1b and switching of the heating current $I_H$ by the actuation of the welding process. For this purpose a thermal sensor 35 is provided at least on one of the two provided electrodes 1a and 1b, preferably in the area of the electrode working surface, which delivers a signal $U(\delta)$ in relation to the working surface temperature $\delta(t)$. The output signal of the thermal sensor 35 is compared on a unit 37 with an error value $U(\delta_o)$ which can preferably be adjusted. The control switches $H_a$ and $H_b$ in the heat current loop of the two electrodes 1a and 1b are opened by a switching control unit 39 when, as indicated by the characteristic line in the unit 39, the measured temperature $\delta$ reaches a predetermined value $\delta_o$ or when at least a predetermined time has been maintained. When the switch S is a provided switching element in the welding current loop and is not, as previously mentioned, formed by the insulation layer distance, this switch will be closed by the opening of heating current control switch $H_a$ and $H_b$. As shown in FIG. 9 by a dotted line, the thermal sensor 35 can be used to monitor temperature for heat and/or welding current regulation, whereby the output signal $U(\delta)$ is supplied as a control value to the unit 37 and is compared there with the nominal value $U(\delta_o)$ and the output signal of the unit 37 is supplied as a control differential to the heating current and/or a welding current generator 17a, 17b or 21 as adjusting links.

Figure 10:
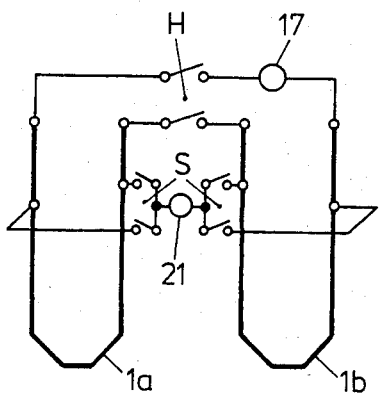

In FIG. 10, which is similar to FIG. 8, the arrangement of two electrodes 1a and 1b of the welding current generators 21, with control switch S, is shown, whereby the same heat current generator 17 with a control switch H for the heating of both electrodes is used. Through the switch H both heating current loops of the electrodes 1a and 1b are connected in series.

Figure 11:
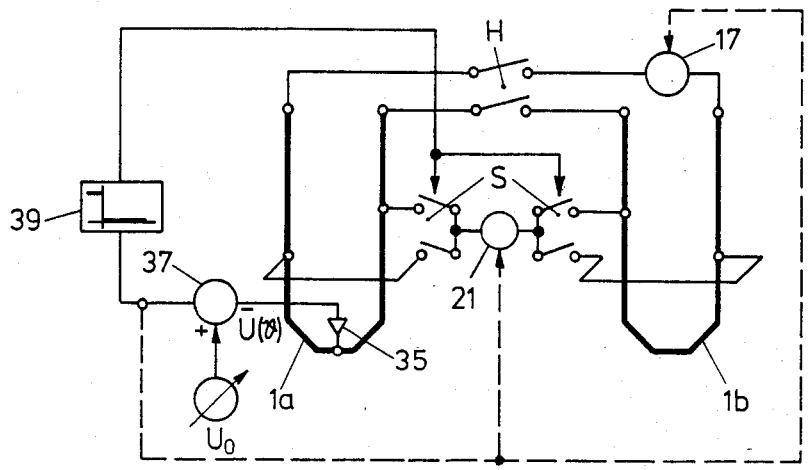

In FIG. 11, which is similar to FIG. 9, the control of the control switch switches H and S and the adjustment of the generators 17 and 21, corresponding to the heating and welding current, with the aid of a thermal sensor 35 is shown.

Figure 12:
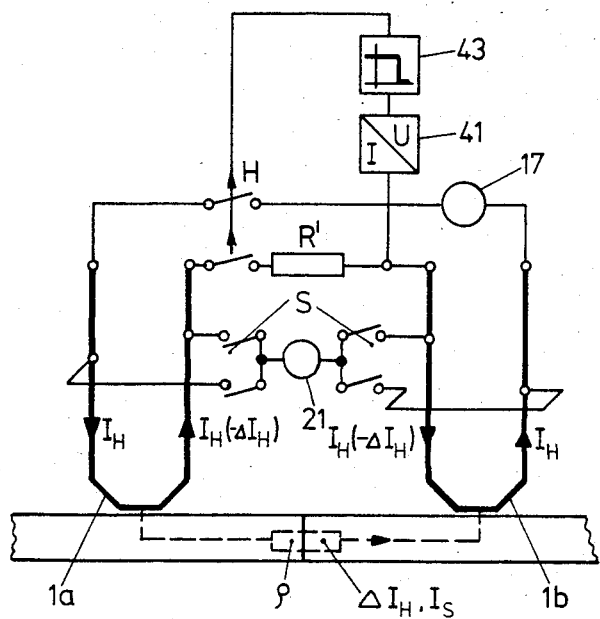

In the series connected heating current of both electrode loops, a further control possibility is the result of the two working phases, the heating phase and the welding phase, which is shown in FIG. 12. In the heating phase the heating current generator 17 is switched through a control switch H and a resistance element R' to the heating current loop of the two electrodes 1a and 1b. Due to the melting of the insulation layer on the work pieces to be connected, a decreasing resistance $\rho$ occurs between the working area and the two electrodes, pointed out in the supplementary picture of the two work pieces according to FIG. 12. Consequently a portion of the heating current $\Delta I_H$ is commuted to the two work pieces to be connected, since $\rho$ and R' appear to be connected in parallel. The current, through the resistance element R', decreases. If one measures a current in the leg of the current loop containing R', for example with the aid of a current/voltage converter 41, one can, through an error value unit 43 shown schematically, preferably with a predetermined error value, open the control switch H and then close S, in case S is not formed through the insulation layer, when the heating current in the measured current leg does not go below a predetermined value. Therefore it is understood that R' is chosen as small as possible in order to keep the created loss of heat as low as possible.

In conclusion, it must be pointed out that due to the arrangement of the welding current generators 21, especially in the improved variations according to FIGS. 5 to 12, that the supply or return for the heating current may not be connected in the upper, i.e. in the portion away from the working area of the electrode. Since for a symetrical division of the welding current (each $I_S/2$) both heat loop legs of the electrode have to be switched to the same potential in FIGS. 5 to 12, the control switch S is therefore shown with two pole circuits which prevent, in the heating operation, a connecting together of the two legs or of the supply and return, and which instead apply a common potential in the welding operation.

I claim:

1. A method for operating a welding electrode arrangement to weld a metal work piece covered by a meltable cover wherein the arrangement comprises a substantially U-shaped electrode with two legs linked at a bottom portion to form an electrode working area, and a counter-electrode, the method comprising the steps of:

applying a first electric potential difference across the ends of said legs of said substantially U-shaped electrode to induce a heating current flow from one end of one of said legs through said bottom portion and back to the other leg for heating up said bottom portion of said substantially U-shaped electrode to melt said meltable cover;

applying a second electric potential difference across both said ends of said legs jointly, and said counter-electrode to induce a welding current flow through both said legs in parallel, through said bottom portion, through said metal work piece, and through said counter-electrode.

2. The method according to claim 1, further comprising the step of measuring the temperature of the bottom portion of said substantially U-shaped electrode and controlling the transition from applying said first electric potential difference across the ends of said legs to the applying of said second electric potential difference across both said ends jointly and said counter electrode as a function of said temperature.

3. The method according to claim 1, further comprising the step of measuring the temperature of the bottom portion of said substantially U-shaped electrode and controlling said first and second electric potential difference in a feedback loop using said measured temperature as a control entity.

4. The method according to claim 1, further comprising the step of measuring the temperature of the bottom portion of said substantially U-shaped electrode and controlling said second electric potential difference in a feedback loop using said measured temperature as a control entity.

5. The method according to claim 1, further comprising the step of measuring the temperature of the bottom portion of said substantially U-shaped electrode and controlling said first electric potential difference in a feedback loop using said measured temperature as a control entity.

6. A welding apparatus for welding metal work pieces covered by meltable covers, comprising:

at least one substantially U-shaped electrode with two legs linked at a bottom portion to form an electrode working area;

a counter-electrode;

generator means with two first outputs for said U-shaped electrode legs said generator means including a heating current source and a welding current source; and switching means, said switching means connecting in one switching position said heating current source through said two first outputs across said two legs of said substantially U-shaped electrode and in the other switching position connecting said welding current source through said two first outputs, jointly and said second output, across said two legs jointly and said counterelectrode.

7. The apparatus according to claim 6, wherein said switching means is electrically controllable, said generator means further comprising a control input for a temperature measuring means and a temperature measuring means, an input signal at said control input from said temperature measuring means controlling said switching means.

8. The apparatus according to claim 7, further comprising presetting means to generate a signal corresponding to a preselected electrode temperature, and a comparing unit, one input of said comparing unit being connected to the output of said presetting means, another input of said comparing unit being connected to said temperature measuring means, the output of said comparing unit being coupled to said switching means for the control thereof.

* * * * *